No. 765,275. PATENTED JULY 19, 1904.
M. M. FIELDS.
PROCESS OF PRODUCING PICTURES.
APPLICATION FILED JULY 28, 1903.
NO MODEL.

WITNESSES:

INVENTOR
Moses M. Fields
BY
Frank S. Appleman
Attorney

No. 765,275. Patented July 19, 1904.

UNITED STATES PATENT OFFICE.

MOSES M. FIELDS, OF LOCKNEY, TEXAS, ASSIGNOR OF TWO-THIRDS TO J. W. EDWARDS AND W. M. WINN, OF TEXAS.

PROCESS OF PRODUCING PICTURES.

SPECIFICATION forming part of Letters Patent No. 765,275, dated July 19, 1904.

Application filed July 28, 1903. Serial No. 167,349. (No model.)

*To all whom it may concern:*

Be it known that I, MOSES M. FIELDS, a citizen of the United States of America, residing at Lockney, in the county of Floyd and State of Texas, have invented certain new and useful Improvements in Processes of Producing Pictures, of which the following is a specification.

This invention relates to fine arts, and more particularly to that class thereunder known as "pictures."

An object of this invention is to produce transparent pictures in a novel manner, the said pictures having for their bases albumen prints of the ordinary kind treated with a compound of ingredients so proportioned as to minimize the labor and steps necessary to give the desired result.

A further object of the invention is to treat a picture of the character noted by a novel process, whereby the picture of the picture is made transparent and then colored, the said picture in its colored state being applied to a transparent face-plate and a transparent backing, the latter of which is treated to enhance the effect produced by the tinting of the picture.

Furthermore, an object of the invention is to produce a picture by a novel process, which will prove efficient and satisfactory in use and comparatively inexpensive.

With the foregoing and other objects in view the invention consists in the details of construction and production to be hereinafter more fully set forth and claimed.

Figure 1:
Figure 2:
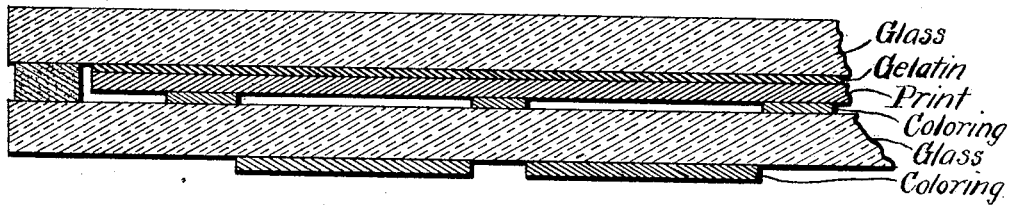

The drawings illustrate, in Figure 1, a face elevation of a picture prepared according to my process; and Fig. 2 is a greatly-exaggerated cross-section, partly fragmentary of Fig. 1.

In the production of a picture after the process of this invention any ordinary albumen print is employed, which before being treated is mounted on glass by the use of a sheet of gelatin dissolved in boiling water to produce a solution. When the print is secured on the glass, the said print is treated with a compound consisting of neat's-foot oil, sixty-six and two-thirds per cent., and wood-alcohol, thirty-three and one-third per cent. In applying the compound the ingredients are well mixed and commingled. The compound is allowed to remain on the print until said print is thoroughly penetrated and the picture is visible from the front and rear of the print. The picture is then painted by coloring the eyes, clothing, flowers, scenery, &c.

In order to thoroughly protect the coloring just described, a second glass is applied to the back of the first glass and stuck thereto by any suitable adhesive material. The picture is finished by painting on the back of the last-mentioned glass the flesh coloring, also the hair and background, and thus the picture is completed and, as stated, is made transparent.

The construction, operation, and advantages will, it is thought, be understood from the foregoing description, it being noted that various changes may be resorted to in the portions and details for carrying invention into practice without departing from the scope thereof.

Having fully described the invention, what I claim as new, and desire to secure by Letters Patent, is—

The process of producing pictures comprising the attachment of an albumen print to a transparent body by sheet-gelatin dissolved in boiling water to produce a solution, the treating of the print with a compound of neat's-foot oil and wood-alcohol dissolved well, painting the back of the transparent print to indicate the eyes, clothing, flowers, and scenery, applying a backing of transparent material and finally painting the back of the backing to represent the flesh coloring, hair and background.

In testimony whereof I affix my signature, in the presence of two witnesses, this 22d day of July, 1903.

MOSES M. FIELDS.

Witnesses:
W. B. MARTIN,
J. B. GILLESPY.